United States Patent [19]

Yao-Psong

[11] Patent Number: 4,518,359
[45] Date of Patent: May 21, 1985

[54] MULTI-PURPOSE INSTRUCTING BLOCK

[76] Inventor: Wang Yao-Psong, No. 16, La. 153, Chien-Te St., Taichung, Taiwan

[21] Appl. No.: 567,176

[22] Filed: Dec. 30, 1983

[51] Int. Cl.³ .................................... G09B 19/02
[52] U.S. Cl. .................................... 434/195
[58] Field of Search ................. 434/195, 196

[56] References Cited

U.S. PATENT DOCUMENTS

| 971,185 | 9/1910 | Freeman | 434/195 |
| 1,594,376 | 8/1926 | Passmore | 434/195 |
| 2,494,469 | 1/1950 | Booth | 434/196 |
| 3,229,388 | 1/1966 | Smith | 434/195 |
| 3,410,002 | 11/1968 | Mulholland et al. | 434/195 |

FOREIGN PATENT DOCUMENTS

| 22073 | of 1929 | Australia | 434/195 |
| 321251 | 5/1902 | France | 434/195 |
| 1296392 | 11/1972 | United Kingdom | 434/195 |

Primary Examiner—William H. Grieb
Attorney, Agent, or Firm—Lowe, King, Price & Becker

[57] ABSTRACT

A multi-purpose instructing block comprising one hundred blocks divided into ten sets and a calculating frame having two grooves which are designed so that the blocks therein may be moved along the grooves. The blocks of the same set are of a size and color but the blocks of different sets differ in color and length. The multi-purpose instructing block is useful to interest the children in calculating, distinguishing between colors, learning alphabets in addition to making toy houses.

1 Claim, 11 Drawing Figures

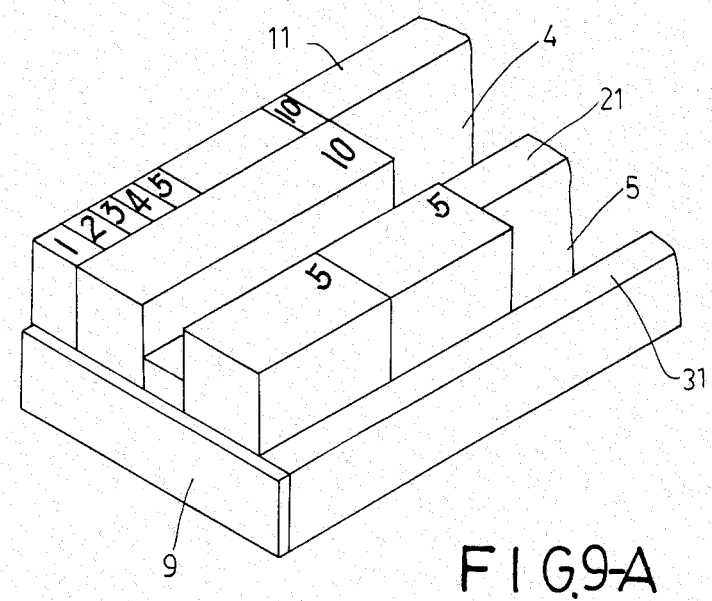
FIG.9-A
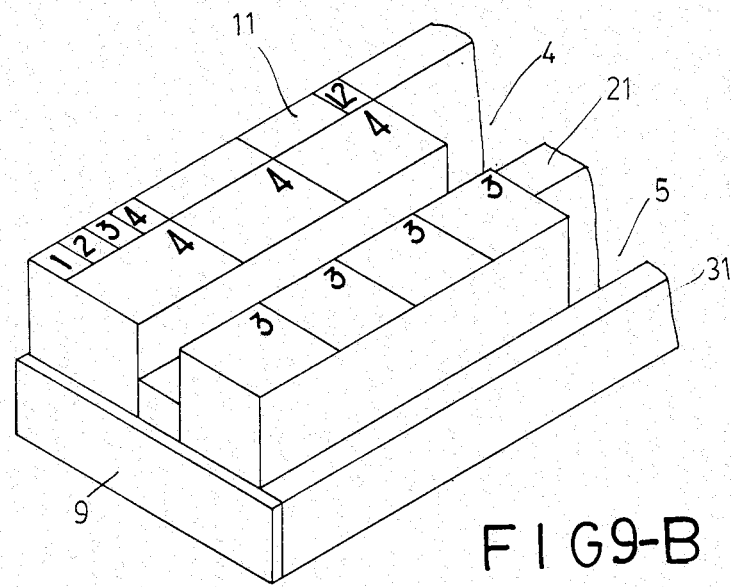
FIG.9-B

MULTI-PURPOSE INSTRUCTING BLOCK

BACKGROUND OF THE INVENTION

Although various kinds of building blocks have been proposed, none of them can lead to satisfactory result.

Accordingly, the inventor of the present invention has decided to design a building block whereby the children may learn calculation, colors and alphabets as well as making toy houses.

SUMMARY

It is a primary object of the present invention to provide a multi-purpose instructing block which is especially designed for teaching children to calculate.

It is another object of the present invention to provide a multi-purpose instructing block which is designed for teaching children to read.

It is still another object of the present invention to provide a multi-purpose instructing block which is designed to teach children to distinguish between colors.

It is still another object of the present invention to provide a multi-purpose instructing block which may be used to make toy houses, etc.

It is still another object of the present invention to provide a multi-purpose instructing block which is easy to manufacture.

It is a further object of the present invention to provide a multi-purpose instructing block which is easy to use.

It is still a further object of the present invention to provide a multi-purpose instructing block which is convenient to carry.

Other objects and merits and a fuller understanding of the present invention will be obtained by those having ordinary skill in the art when the following detailed description of the best mode contemplated for practicing the invention has been read in conjunction with the accompanying drawings wherein like numerals refer to like or similar parts and in which:

BRIEF DESCRIPTION OF THE DRAWINGS

FIG. 9-A shows how to use the present invention to find out the fractional relationship between two numbers;

FIG. 9-B shows how to use the present invention to find out the multiple relationship between two numbers.

DETAILED DESCRIPTION OF THE PREFERRED EMBODIMENT

Figure 1:
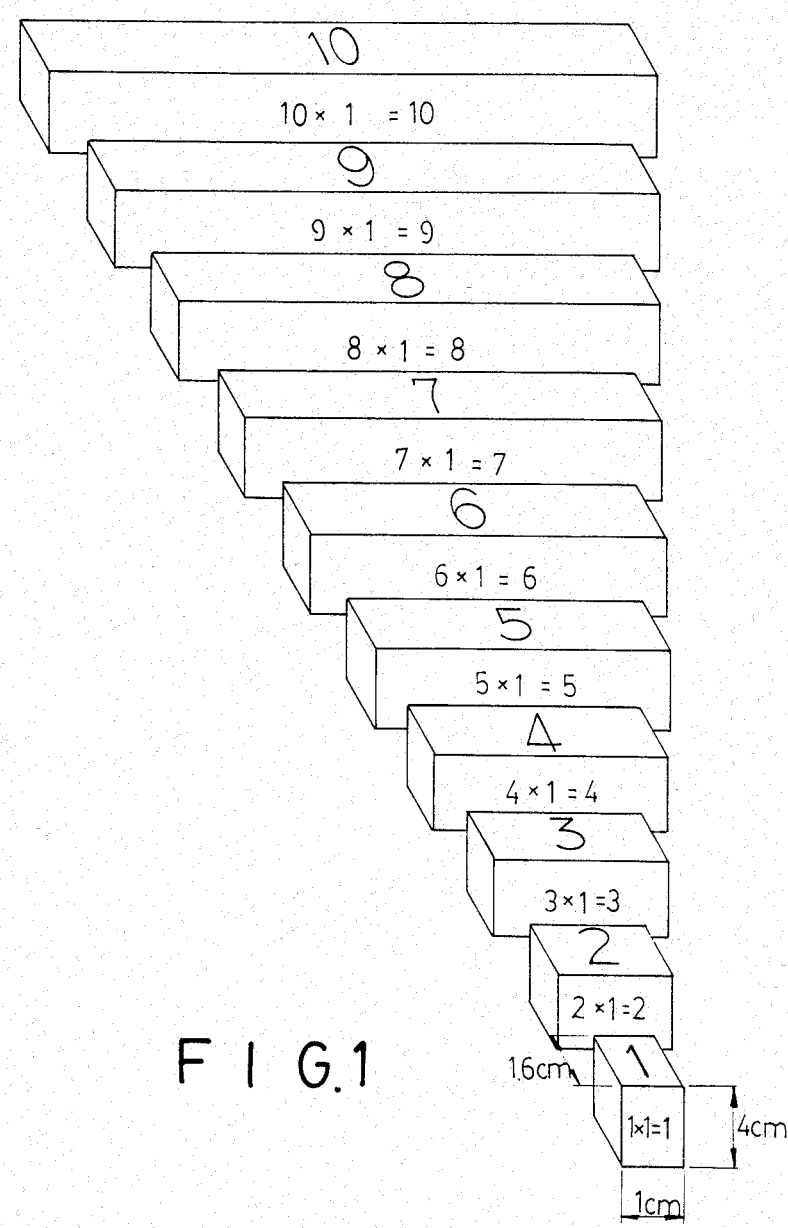
FIG. 1 is a perspective view showing the first block of each set of the multi-purpose instructing block embodying the present invention.
Figure 2:
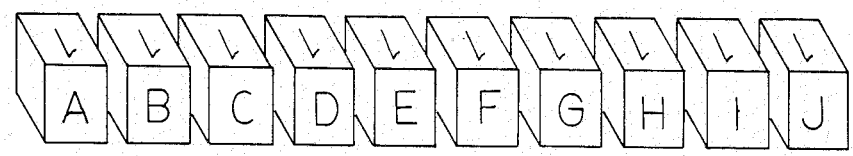
FIG. 2 is a perspective view showing the rear sides of the blocks of the first set of the multi-purpose instructing block.

The multi-purpose instructing block according to the present invention comprises 100 blocks which are divided into 10 equal sets each having 10 blocks. The first block of each set is shown in FIG. 1. The blocks of all sets are equal in width and height. The blocks of the same set are of a size and color but the blocks of different sets differ in color and length. The blocks of the first set are marked by 1, the blocks of the second set are marked by 2, . . . and the blocks of the tenth set are marked by 10. In this preferred embodiment, the blocks of all sets are 4 cm high and 1.6 cm wide (as shown in FIG. 1). The blocks marked by 1, 2, 3, 4, 5, 6, 7, 8, 9 and 10 are 1 cm, 2 cm, 3 cm, 4 cm, 5 cm, 6 cm, 7 cm, 8 cm, 9 cm and 10 cm in length respectively.

Figure 3:
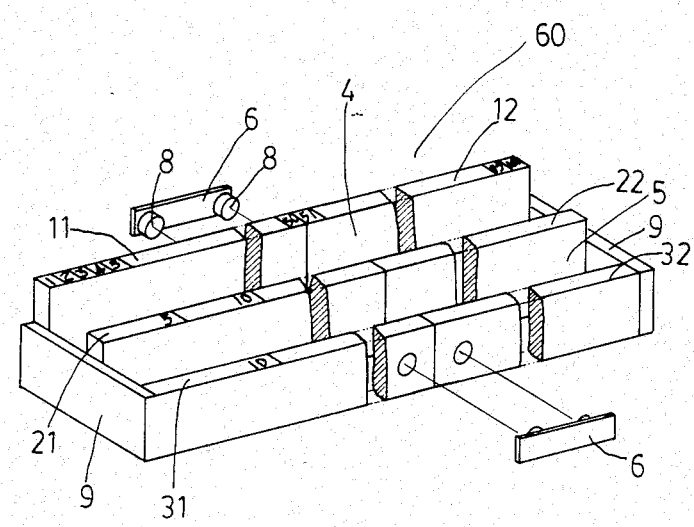
FIG. 3 shows the calculating frame of the multi-purpose instructing block.

With reference to FIG. 3, there is shown a perspective view of the calculating frame of the present invention. As illustrated, the calculating frame (60) comprises two parts. The first part includes three boards (11, 21, 31), a base board (not shown) on which are fixed the three boards, and a side board (9) joined to the three boards (11, 21, 31), which are arranged to form two grooves (4) and (5). The second part is identical to the first part in structure, and includes three boards (12, 22, 32), a base board (not shown) on which are fixed the three boards, and a side board (9), which are arranged to form two grooves (4) and (5). The two parts are joined together by two connectors (6) each provided with two protuberances (8). Each one of the boards (11) and (12) is 4.2 cm high and is divided into 50 equal lattices; the lattices of the board (11) are marked by 1, 2, 3, . . . 50 while the board (12) are marked by 51, 52, . . . 100. Each one of the boards (21) and (22) is 3.2 cm high and is divided into 20 equal lattices; the lattices of the board (21) are marked by 5, 10, . . . 50 while the lattices of the board (22) are marked by 55, 60, . . . 100. Each one of the boards (31) and (32) is 2.2 cm in height and is divided into 10 lattices; the lattices of the board (21) are marked by 10, 20, . . . 50 while the lattices of the board (22) are marked by 60, 70, . . . 100.

Figure 4:
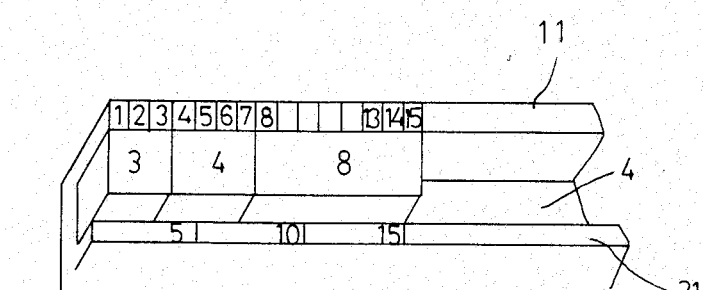
FIG. 4 shows how to use the present invention to find the sum of one-digit numbers.

Turning to FIG. 4 there is shown the way how to use the present invention to add up one-digit numbers. First place the blocks desired to be added up into the groove (4) of the calculating frame (60) and then push them to the left with reference to FIG. 4 to contact the side board (9) (not shown in FIG. 4). Then, the number of line aligned with the most right edge of the blocks is the sum of the blocks placed into the groove (4). As illustrated, three blocks respectively marked by 3, 4 and 8 are first placed into the groove (4) and then pushed to the left with reference to FIG. 4 to be in contact with the side board (9) (not shown in FIG. 4). Then, the number of the line aligned with the most right edge of the blocks (3, 4, 5) is the sum of the blocks.

Figure 5:
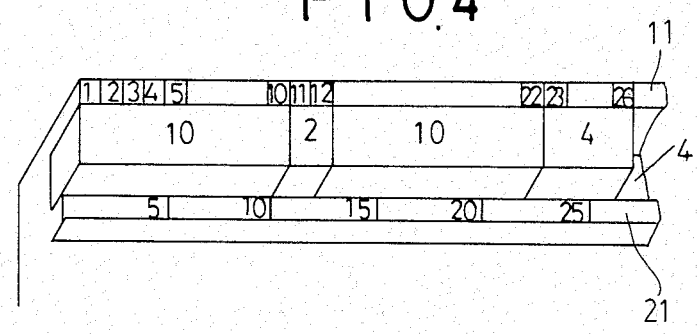
FIG. 5 shows how to use the present invention to add up two-digit numbers.

Referring to FIG. 5, there is shown the way how to use the present invention to add up two-digit numbers. As shown, the first two-digit number 12 represented by a block marked by 10 and another block marked by 2, and the second two-digit number 14 represented by a block marked by 10 and another block marked by 4 are first placed into the groove (4) and then pushed to the left with reference to FIG. 5 to be in contact with the side board (9) (not shown in FIG. 5). As a result, the most right edge of the blocks marked by 10, 2, 10 and 4 is in alignment with the twenty-sixth line of the board (21); then, the sum of the two two-digit numbers 12 and 14 is 26.

Figure 6:
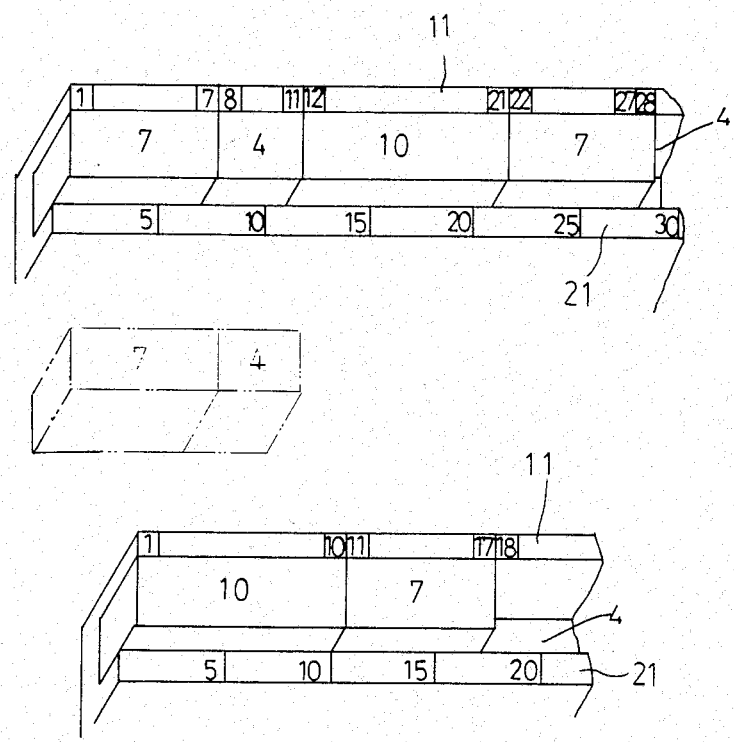
FIG. 6 shows how to use the present invention to solve a simple problem in subtraction.

With reference to FIG. 6, there is shown the way how to use the present invention to solve a simple problem in subtraction. First, place four blocks respectively marked by 7, 4, 10 and 7 into the groove (4) of the calculating frame (60). Then push the block to the left to be in contact with the side board (9) (not shown in FIG. 6). Take out two blocks marked by 7 and 4 from the groove (4) and push the blocks remained in the groove (4) to the left to contact the side board (9) (not shown in FIG. 6). Then the most right edge of the blocks placed into the groove (4) is aligned with the seventeenth line of the board (11), so that the difference between 28 and 11 is 17. It should be noted that present invention may be served to solve all problems in subtraction; provided, the minuend is less than 100 but greater than the subtrahend.

Figure 7:
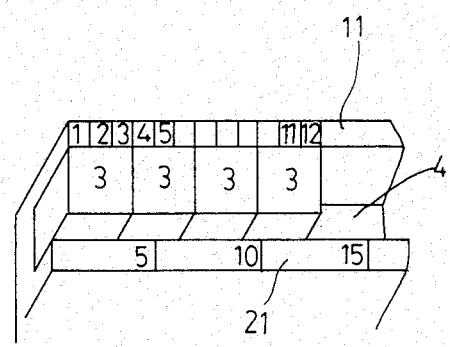
FIG. 7 shows how to use the present invention to solve a simple problem in multiplication.

Referring to FIG. 7, there is shown the way how to use the present invention to solve a simple problem in multiplication. Take the number marked on the block as a multiplicand and the amount of blocks placed in the groove (4) as a multiplier. Then, the line aligned with the most right edge of the blocks placed into the groove (4) is the product. As illustrated, place 4 blocks marked by 3 into the groove (2). Thus, the multiplicand is 3 while the multiplier is 4. Then the blocks are aligned with the twelve line of the board (11) and so the product is 12.

Figure 8:
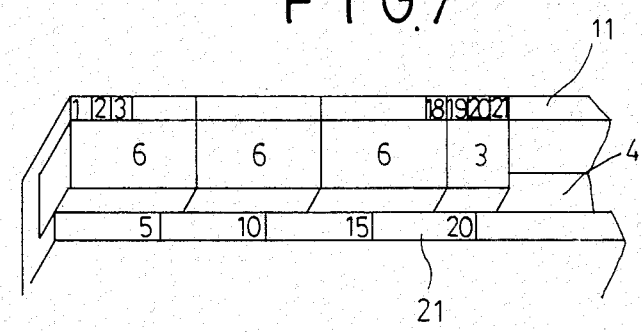
FIG. 8 shows how to use the present invention to solve a simple problem in division.

With reference to FIG. 8, there is shown the way how to use the present invention to solve a simple problem in division. When desired to solve a problem in division, first select a number marked on the board (11) as dividend, then take a random number as a divisor. Place a block whose number is equal to the divisor into the groove (4) but not pass over the line representing the dividend. Then the number of the blocks placed into the groove (4) is the quotient. When the most right edge of the blocks cannot aligned with the line representing dividend, that means the dividend has remainder; then place an additional block to cause the most right edge of the blocks to align with the line representing dividend. Then, the number marked on the additional block is equal to the remainder of the dividend.

Referring to FIG. 9-A, there is shown the way how to use the present invention to find out the fractional relationship between two numbers. First place one or more blocks marked by the same number into the groove (4). Then select a number of block of a set into the groove (5) of the calculating frame (60) so that when pushed to the left with reference to FIG. 9-A to be in contact with the side board (9) (not shown in FIG. 9-A) they will be in alignment with the most right edge of the block placed into the groove (4). As shown in FIG. 9-A, a block marked by 10 is placed into the groove (4) while two blocks marked by 5 are placed into the groove (5).

Thus, we have:

1. 1 block marked by 10 = 2 blocks marked by 5.

Therefore, 10 is twice as large as 5;

2. 2 blocks marked by 5 = 1 block marked by 10.

Therefore, 5 is one-half as large as 10.

With reference to FIG. 9-B, it is shown another example to use the present invention to find out the multiple relationship between two numbers. First place 3 blocks marked by 4 into the groove (4) and 4 blocks marked by 3 into the groove (5). Then, we have:

1. 3 blocks marked by 4 = 4 blocks marked by 3.

Therefore, 3 times of 4 is equal to 4 times as large as 3, and so 1 time of 4 is equal to 4/3 times of 3.

2. 4 blocks marked by 3 = 3 blocks marked by 4.

Therefore, four times of 3 is equal to three times of 4, and so one time of 3 is equal to 3/4 times of 4.

Figure 10:
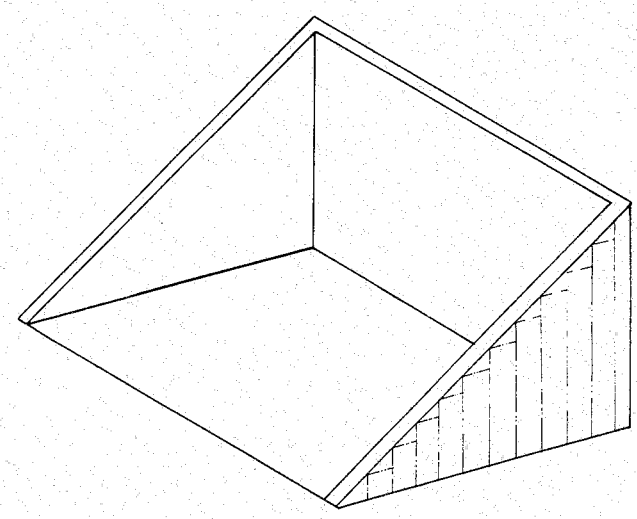
FIG. 10 is a perspective view showing the container of the present invention.

Turning to FIG. 10, there is shown a perspective view of the container of the present invention. As illustrated, the container is triangular in shape which is designed so that all blocks can be received therein for storage.

It is emphasized that the sides other than those marked by numbers may be provided with alphabets, multiplication table, and colors so as to enhance the instructing effects to the children. Furthermore, the blocks may be put together as generally used to make toy houses, toy cars, etc.

Although this invention has been described with certain degree of particularity, it is understood that the present disclosure has been made by way of example only and that numerous changes in the detail of construction and the combination and arrangement of parts may be resorted to without departing from the scope and spirit of the invention as hereinafter claimed.

I claim:

1. An educational aid for teaching mathematics, comprising:

(a) M blocks of generally equal height and width divided into N sets each containing L blocks (where M/N is an integer), each of the L blocks in the associated one of said N sets being of equal length to each other, wherein said equal length in each set corresponds to a unit length multiplied by a number (N) representing the associated Nth set, each of the L blocks in the Nth set displaying indicia representing the numeral N of each set; and (b) a calculating frame including first and second frame sections each having three spaced boards extending generally parallel to each other and connected together with a side board, said spaced boards defining therebetween first and second grooves for receiving selected ones of said M blocks, and means for joining said first and second frame sections together so that the first and second grooves in the first frame section are continuous and in respective alignment with the first and second grooves of the second section, said joining means including a pair of connectors each formed with protuberances and respectively engageable with selected ones of said spaced boards in each first and second frame section for joining same together, said first board in said first section having a display edge divided by indicia into M/2 lattices containing respectively consecutive numbers beginning with "1", said first board in said second section also including a display edge divided by indicia into M/2 lattices respectively containing consecutive numbers starting with M/2+1, said second board of the first section being divided into M/10 lattices respectively containing numbers increasing by "5" to M/2, said second board of said second section also being divided into M/10 lattices respectively containing numbers increasing by "5" from M/2+5 to M, said third board of the first section being divided into M/20 lattices respectively containing numbers increasing by "10" to M/2, said third board of said second section also being divided into M/20 lattices respectively containing numbers increasing by "10" from M/2+10 to M, said lattices enabling a user to carry out addition, subtraction, multiplication, division and learn fractional relationships by positioning suitable ones of said M blocks into the first and second grooves to thereby deduce mathematical relationships with reference to said lattices.

* * * * *